US007862337B2

(12) United States Patent
Panicali

(10) Patent No.: US 7,862,337 B2
(45) Date of Patent: Jan. 4, 2011

(54) ADDITION AND SUBTRACTION DICE GAME

(76) Inventor: Marcello Panicali, 2357 84th St., Brooklyn, NY (US) 11214

( * ) Notice: Subject to any disclaimer, the term of this patent is extended or adjusted under 35 U.S.C. 154(b) by 847 days.

(21) Appl. No.: 11/809,128

(22) Filed: May 31, 2007

(65) Prior Publication Data

US 2007/0298391 A1 Dec. 27, 2007

Related U.S. Application Data

(60) Provisional application No. 60/803,607, filed on May 31, 2006.

(51) Int. Cl.
*G09B 19/22* (2006.01)
(52) U.S. Cl. .................... 434/128; 434/188
(58) Field of Classification Search ............ 434/128, 434/188, 191, 200, 202, 205, 207; 273/266, 273/268
See application file for complete search history.

(56) References Cited

U.S. PATENT DOCUMENTS

| | | | | |
|---|---|---|---|---|
| 1,238,522 A * | 8/1917 | Kalista | ............ | 273/269 |
| 1,729,023 A * | 9/1929 | Andrews | ............ | 273/268 |
| 3,747,934 A * | 7/1973 | Barrett | ............ | 273/268 |
| 4,114,290 A * | 9/1978 | Cooper | ............ | 434/200 |
| 4,359,227 A * | 11/1982 | Porciello | ............ | 273/268 |
| 4,410,182 A | 10/1983 | Francis | | |
| 4,421,315 A * | 12/1983 | Cutler | ............ | 273/268 |
| 4,684,136 A * | 8/1987 | Turner | ............ | 273/271 |
| 4,927,158 A * | 5/1990 | Lierman | ............ | 273/268 |
| 5,083,793 A * | 1/1992 | Sanford | ............ | 273/249 |
| 5,176,381 A * | 1/1993 | Winters | ............ | 273/146 |
| 5,386,998 A * | 2/1995 | Mader et al. | ............ | 273/237 |
| 5,405,145 A * | 4/1995 | Jones et al. | ............ | 273/146 |
| 5,421,732 A | 6/1995 | Taylor | | |
| 5,605,331 A * | 2/1997 | Boe | ............ | 273/146 |
| 5,607,156 A * | 3/1997 | Samarasinghe | ............ | 273/146 |
| 5,649,704 A * | 7/1997 | Dobbin | ............ | 273/268 |
| 6,089,871 A * | 7/2000 | Jaffe | ............ | 434/209 |
| 6,299,166 B1 * | 10/2001 | Factor | ............ | 273/146 |
| 6,341,779 B1 * | 1/2002 | Merritt | ............ | 273/292 |
| 6,752,393 B2 * | 6/2004 | DiGirolamo et al. | ............ | 273/268 |
| 6,811,402 B1 * | 11/2004 | Ritchie | ............ | 434/191 |
| 6,942,218 B2 * | 9/2005 | Davis et al. | ............ | 273/268 |
| 2004/0157197 A1 * | 8/2004 | Hepner | ............ | 434/191 |

* cited by examiner

*Primary Examiner*—Kurt Fernstrom
(74) *Attorney, Agent, or Firm*—James Ray & Assoc

(57) ABSTRACT

An educational game apparatus for practicing arithmetic skills including at least two numbered dice, a game platform with at least two rows of apertures containing removable pegs, and at least ten numbered columns forming a rectangular array with said at least two rows of apertures. A method of play is also described, with the objective of being the first player to remove all the pegs from the board before losing one's turn.

2 Claims, 2 Drawing Sheets

ADDITION AND SUBTRACTION DICE GAME

CROSS REFERENCE TO RELATED APPLICATION

This patent application is related to and claims priority from U.S. Provisional Patent Application Ser. No. 60/803,607 filed May 31, 2006.

FIELD OF THE INVENTION

The present invention relates, in general, to games for teaching arithmetic to young children and, more particularly, this invention relates to a game using dice and pegs to help teach addition and subtraction skills.

BACKGROUND OF THE INVENTION

Prior to the conception and development of the present invention, children can become bored by conventional means of teaching math skills, such as addition and subtraction. Flash cards would be one example. Games of all sorts have been devised to amuse the students while at the same time educate them and help them practice their skills in an interesting way. Card games abound for this purpose.

There are many mathematical instruction games involving dice. For example, in U.S. Pat. No. 1,729,023, Andrews teaches a dice game where covers are slid over numbers that correspond to the numerals indicated by the dice or the sum of the two dice. Numerous dice math games involve use of a special die with operation symbols on them, such as U.S. Pat. No. 3,314,168. Another is U.S. Pat. No. 4,114,290, which teaches an arithmetic dice game for two players with a dice "popper" dome for numerical dice and an operant die. If the player answers the problem posed by the dice correctly, he or she get to place a peg in a hole on a 12×12 array that corresponds to the numbers appearing. The one to first place all of his or her pegs is the winner. U.S. Pat. No. 6,786,485 also teaches a mathematical dice game involving numbered dice and an operant die.

In U.S. Pat. No. 5,386,998, Mader discloses a math game apparatus involving dice and pegs wherein a multiplicity of pegs numbered on one end are mounted along one wall of a box on a axel through the radial center of each peg. The sum of dice thrown determine which peg numbers get rotated out of view. The Mader game uses only addition and is of little educational value. Another game exercising only addition skill is disclosed in U.S. Pat. No. 4,410,182.

SUMMARY OF THE INVENTION

The present invention provides an educational game apparatus for practicing arithmetic skills including at least two numbered dice of a first color, one numbered die of a second color, a game platform with at least two rows of apertures containing removable pegs, and at least ten numbered columns forming a rectangular array with said at least two rows of apertures.

A game-like method of practicing addition and subtraction utilizing the apparatus of the invention by any number of players is also disclosed. The object of the game is to be the first to remove all the pegs on the game platform by selectively removing those from columns such that individually or their sum equals the answer to a subtraction problem consisting of subtracting the number on one die from the sum of two other dice. In an alternative method of play, the subtraction die is eliminated, and only the sum is used.

OBJECTS OF THE INVENTION

It is, therefore, one of the primary objects of the present invention to provide an enjoyable educational game for practicing arithmetic skills.

Another object of the present invention is to provide an inexpensive game apparatus that is both easy to play while reinforcing math skills, especially subtraction.

Still another object of the present invention is to provide an arithmetic game that can be played by any number of players thus overcoming a shortcoming of many games which are only for two players.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures and with the appended claims.

DESCRIPTION OF A PRESENTLY PREFERRED EMBODIMENT OF THE INVENTION

Figure 1:
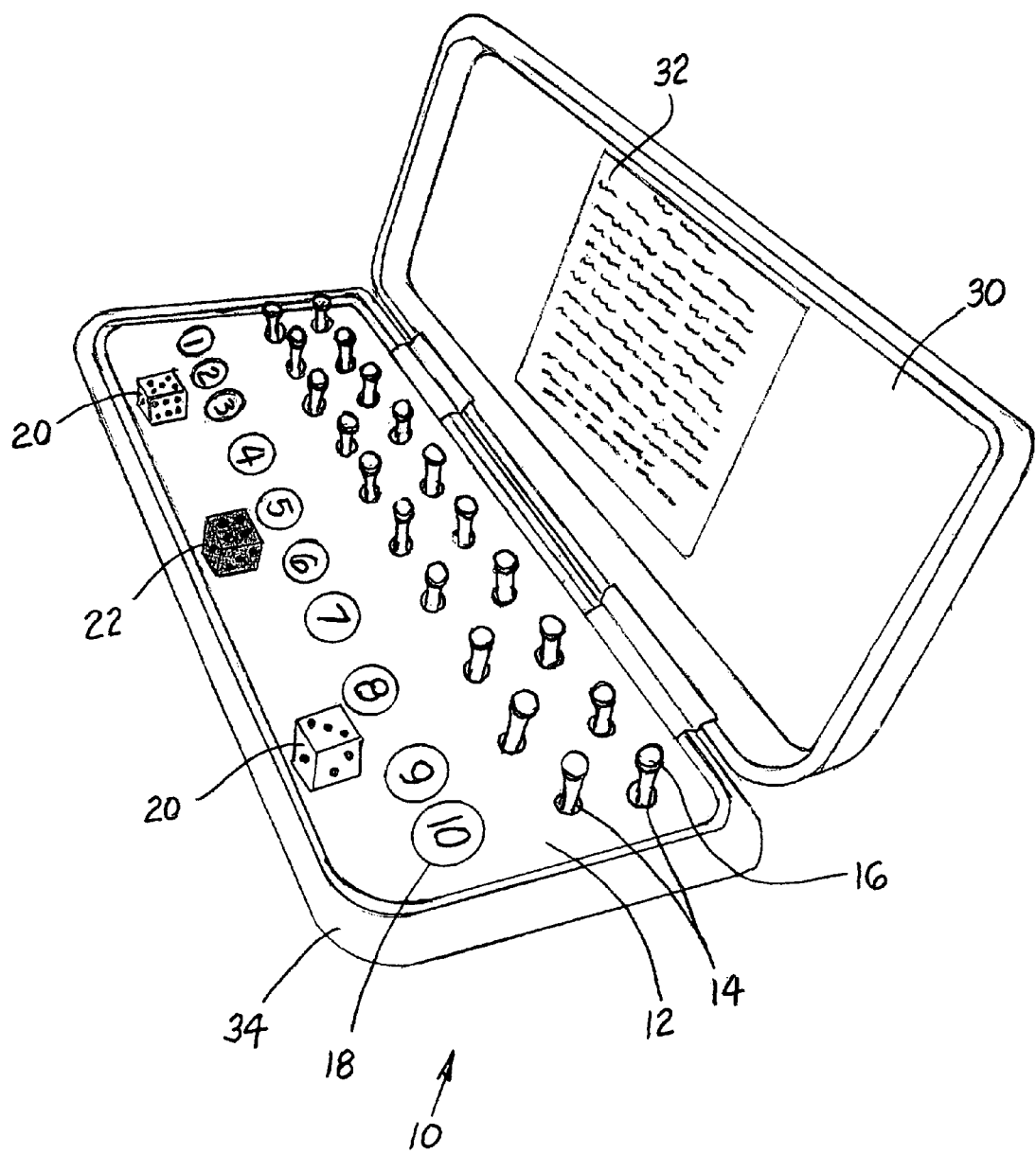
FIG. 1 is perspective view of the game apparatus.

Prior to proceeding to the more detailed description of the present invention it should be noted that, for the sake of clarity and understanding, identical components which have identical functions have been identified with identical reference numerals throughout the several views illustrated in the drawing figures.

Referring initially to FIG. 1, the game apparatus 10 is shown with the lid 30 open and ready for play. The game board 12 in this case has two rows with ten peg holes 14 in each row. The columns are labeled sequentially with numbers 18. The peg holes 14 are each filled with pegs 16, in this example blunt golf tees. There are at least two addition dice 20, all of one color, and one subtraction die 22, of a different color. The game board 12 and associated pieces are all housed in a closeable case 34, with a lid 30, having game playing instructions 32 attached to the inside of the lid 30.

Figure 2:
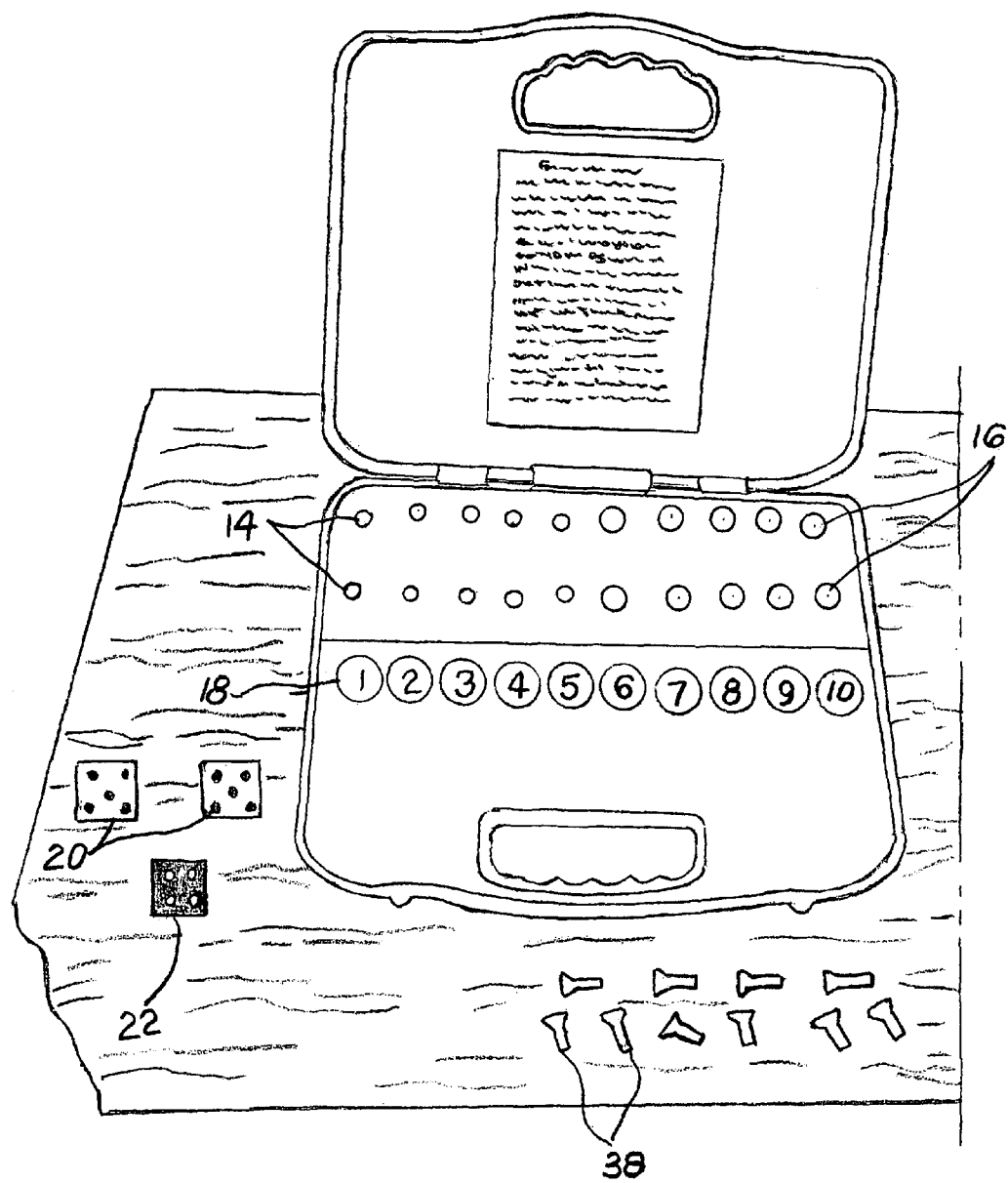
FIG. 2 is a top view illustrating peg removal after a first roll of the three dice.

In FIG. 2, the player's response is shown after a first roll of the dice, 20 and 22. The sum of the two addition dice 20 is ten, while the subtraction die 22 is a four. With a difference equal to six, the player can then remove a six column peg and pairs of pegs 16, such that the sum of the numbers corresponding to each peg's column 18 totals the same as the difference answer. In this example, the allowed combinations include one and five, two and four, three and three, four and two, and five and one. The player then continues his turn by rolling the dice 20 and 22 again, and removing pegs 16 as allowed, until he or she no longer has any peg combinations removable by the rules, or all the pegs have been removed, which is the objective of the game. If that player cannot legally remove any more pegs, then all removed pegs 38 are returned to the holes 14 and the next player gets a chance at removing all the pegs. If any player obtains a negative difference answer, pegs summing to the absolute value of that negative difference are returned to the board holes 14, but that player can still continue playing until he or she has no available moves or wins. If the player obtains a difference equal to zero, he does not lose a turn, just rolls again.

In one variation of the game, there could be three addition dice instead of two. Also, there could be more or less than 10 columns on the game board. In another method of play, only the addition dice would be used.

While a presently preferred embodiment of the present invention has been described in sufficient detail above to enable a person skilled in the relevant art to make and use the same, it should be obvious that various other adaptations and modifications can be envisioned by those persons skilled in such art without departing from either the spirit of the invention or the scope of the appended claims.

I claim:

1. A game-like method of practicing addition and subtraction comprising:
   a) providing a game platform having a multiplicity of peg-receiving apertures on a game board in at least two rows and at least ten numbered columns;
   b) starting said game by placing a removable peg in each of said apertures;
   c) providing at least two numbered dice of a first color and one numbered die of a second color;
   d) having a designated player roll in any fashion said at least two dice of said first color and said one die of said second color;
   e) having said designated player determine a sum of numbers on said at least two first colored dice;
   f) having said designated player subtract number appearing on said second colored die from said sum of at least two first colored dice to establish a difference answer;
   g) having said designated player remove said pegs corresponding to said difference answer, and also in pairs one from each row wherein said pegs are in said numbered columns wherein sum of corresponding two numbers total to correct said difference answer until all allowable pairs have been removed;
   h) having said designated player continue play with another roll of said dice and additional peg removal until no peg removals are permissible, at which point all removed pegs are returned to said apertures and another player begins;
   i) requiring any player rolling a difference answer with a negative value to return pegs to apertures equaling or summing to absolute value of said negative value, but player continues with turn;
   j) allowing player rolling a difference answer equal to zero to roll again; and
   k) declaring first player to remove all pegs to be winner.

2. A method of playing a dice and peg game comprising:
   a) providing a game platform having a multiplicity of peg-receiving apertures on a game board in at least two rows and at least ten numbered columns;
   b) starting said game by placing a removable peg in each of said apertures;
   c) providing at least two numbered dice;
   d) having a designated player roll in any fashion said at least two dice;
   e) having said designated player determine a sum of numbers on said at least two dice;
   f) having said designated player remove said pegs corresponding to said sum, and also in pairs one from each row wherein said pegs are in said numbered columns wherein sum of corresponding two numbers total to correct said sum until all allowable pairs have been removed;
   g) having said designated player continue play with another roll of said dice and additional peg removal until no peg removals are permissible, at which point all removed pegs are returned to said apertures and another player begins; and
   h) declaring first player to remove all pegs to be winner.

* * * * *